US012256312B2

(12) United States Patent
Zhu

(10) Patent No.: US 12,256,312 B2
(45) Date of Patent: Mar. 18, 2025

(54) METHOD AND SYSTEM FOR MANAGING COMPONENTS OF A FIFTH GENERATION (5G) NETWORK SLICE

(71) Applicant: Zhongwen Zhu, Saint-Laurent (CA)

(72) Inventor: Zhongwen Zhu, Saint-Laurent (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 592 days.

(21) Appl. No.: 17/617,217

(22) PCT Filed: Jul. 15, 2019

(86) PCT No.: PCT/IB2019/056028
§ 371 (c)(1),
(2) Date: Dec. 7, 2021

(87) PCT Pub. No.: WO2021/009539
PCT Pub. Date: Jan. 21, 2021

(65) Prior Publication Data
US 2022/0240158 A1 Jul. 28, 2022

(51) Int. Cl.
H04W 40/24 (2009.01)
(52) U.S. Cl.
CPC ................. H04W 40/248 (2013.01)
(58) Field of Classification Search
None
See application file for complete search history.

(56) References Cited

U.S. PATENT DOCUMENTS

| 10,037,231 | B1 | 7/2018 | Jakhetiya | |
|---|---|---|---|---|
| 2016/0301593 | A1* | 10/2016 | Blair | H04L 41/122 |
| 2017/0265189 | A1* | 9/2017 | Stephenne | H04W 72/51 |
| 2018/0053401 | A1 | 2/2018 | Martin | |
| 2018/0077023 | A1 | 3/2018 | Zhang | |
| 2018/0376414 | A1* | 12/2018 | Zeng | H04W 8/02 |
| 2019/0174498 | A1* | 6/2019 | Samdanis | H04W 16/10 |
| 2020/0195495 | A1* | 6/2020 | Parker | H04L 41/40 |
| 2020/0250002 | A1* | 8/2020 | Gururaj | G06F 9/5027 |
| 2021/0084525 | A1* | 3/2021 | Takano | H04W 4/06 |
| 2021/0258941 | A1* | 8/2021 | Chou | H04W 72/542 |
| 2024/0073796 | A1* | 2/2024 | Azizi | H04W 76/14 |

FOREIGN PATENT DOCUMENTS

EP 2741531 A1 3/2019
WO 2018125686 A2 7/2018

* cited by examiner

Primary Examiner — Saumit Shah
(74) Attorney, Agent, or Firm — Ericsson Canada Inc.; Julie Dufort

(57) ABSTRACT

The disclosure relates to a method and system, for managing components of a fifth generation (5G) network slice. The method comprises retrieving current locations of a plurality of user equipments (UEs) connected to radio base stations (RBSs) in communication with the 5G network slice; predicting future traffic at the RBSs based on past and current locations of the plurality of UEs; and managing the components of the 5G network slice based on the predicted future traffic patterns.

21 Claims, 7 Drawing Sheets

METHOD AND SYSTEM FOR MANAGING COMPONENTS OF A FIFTH GENERATION (5G) NETWORK SLICE

TECHNICAL FIELD

The present disclosure relates to 5G and network slicing.

BACKGROUND

FIG. 1a illustrates a 5G mobile network 100 in which a service provider 102, either a media company for content generation, a communication service provider for a video call or conference, or a gaming service provider, etc., delivers services to users/subscribers 112 through a fifth generation (5G) mobile network operator 104.

Within the 5G operator network 104, all the functionalities for supporting network slicing that guarantee availability of resources (computing capacity, storage and network connectivity) from an end-to-end point of view can be deployed in edge data centers (DC)s 108 or in a core DC 106.

A packet delivery service instance (PDSI) 110 is deployed in edge DC 108 and/or core DC 106 to provide a data delivery service to all the mobile devices 112 attached to the 5G mobile network 100.

The data can be related to pre-recorded contents, which are generated by the content providers and supplied through the application platform. The data can also be related to different applications, such as gaming, etc.

SUMMARY

The system of FIG. 1a works fine in a static environment, but once the users/subscribers 112 start moving, management of the components of the 5G network or of a 5G network slice is called for.

There is provided a method for managing components of a fifth generation (5G) network slice. The method comprises retrieving current locations of a plurality of user equipments (UEs) connected to radio base stations (RBSs) in communication with the 5G network slice; predicting future traffic at the RBSs based on past and current locations of the plurality of UEs; and managing the components of the 5G network slice based on the predicted future traffic patterns.

There is provided a system for managing components of a fifth generation (5G) network slice comprising processing circuits and a memory. The memory contains instructions executable by the processing circuits whereby the system is operative to: retrieve current locations of a plurality of user equipments (UEs) connected to radio base stations (RBSs) in communication with the 5G network slice; predict future traffic at the RBSs based on past and current locations of the plurality of UEs; and manage the components of the 5G network slice based on the predicted future traffic patterns.

There is provided a non-transitory computer readable media having stored thereon instructions for managing components of a fifth generation (5G) network slice according to any of the steps described herein.

The method and system provided herein present improvements to the way 5G network slices operate.

DETAILED DESCRIPTION

Various features will now be described with reference to the figures to fully convey the scope of the disclosure to those skilled in the art.

Many aspects will be described in terms of sequences of actions or functions. It should be recognized that according to some aspects, some functions or actions could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed; these are generally illustrated with dashed lines.

When a special or ad-hoc event occurs at a certain location, the information related to this event, usually in the form of image, text, sound or video can propagate to the world in a matter of minutes or seconds. The current trend is that the time needed to propagate the information is getting shorter and shorter. Hence, it can be expected that the number of requests for packet delivery service (PDS), per second, for an ad-hoc event, can increase significantly quite suddenly.

Apart from ad-hoc events, sought-after data can also be related to a pre-scheduled event, such as a conference or a music show, a sports game, etc. In that case, the data source is provided by a content provider who owns the copyright and the data can take all the forms enumerated previously (image, text, sound or video) and also virtual reality.

Other type of sought-after data can relate to popular on-line video games. In that case, the data can take all the forms enumerated previously (image, text, sound, video or virtual reality) and also augmented reality.

Although these scenarios are already very complicated, it is even more challenging for the network to deliver such data when all the receivers (mobile devices 112) are moving at the same time, especially if these devices are moving at different speeds and in different directions.

Figure 1A:
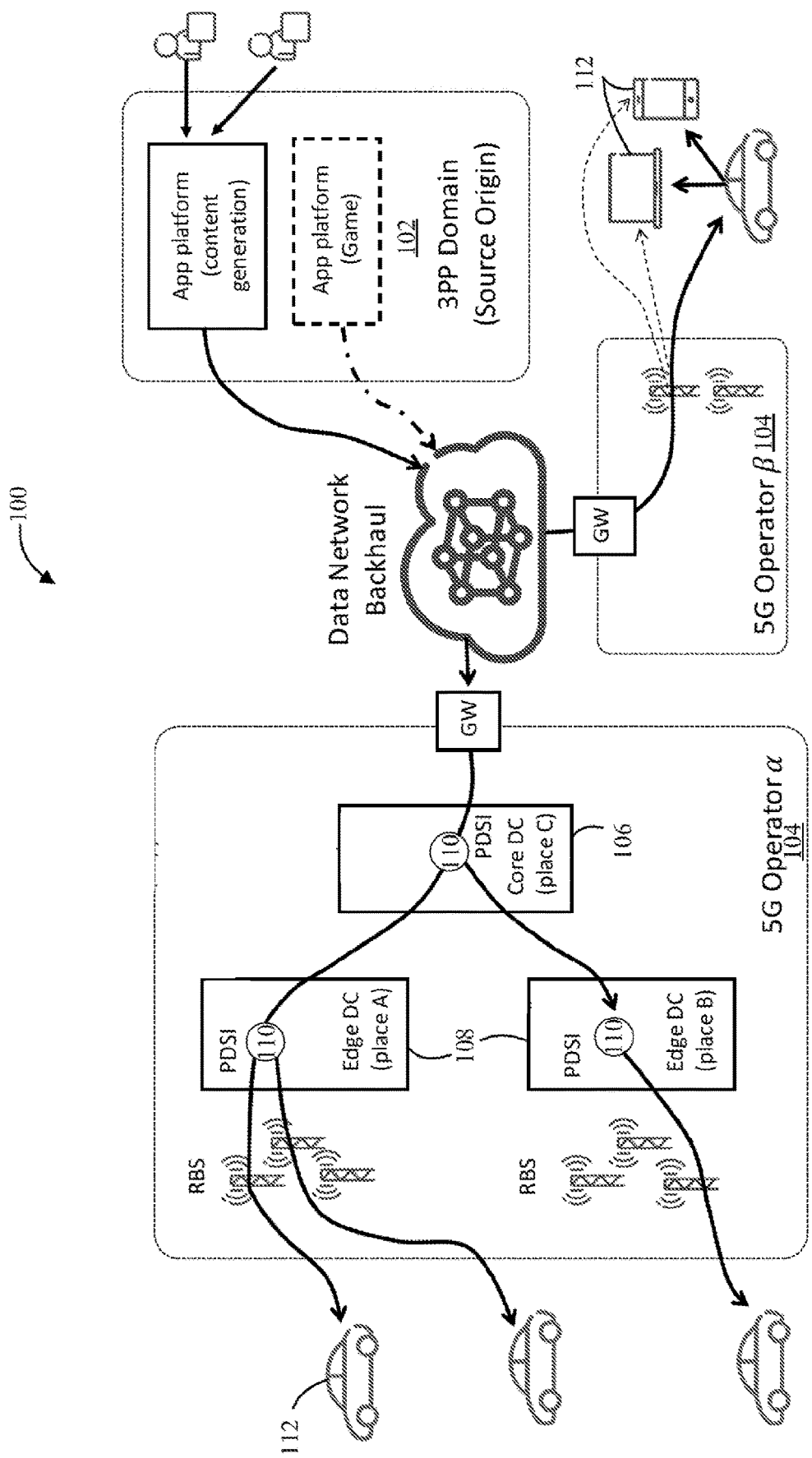
FIG. 1a is a schematic illustration of a 5G network or network slice.
Figure 1B:
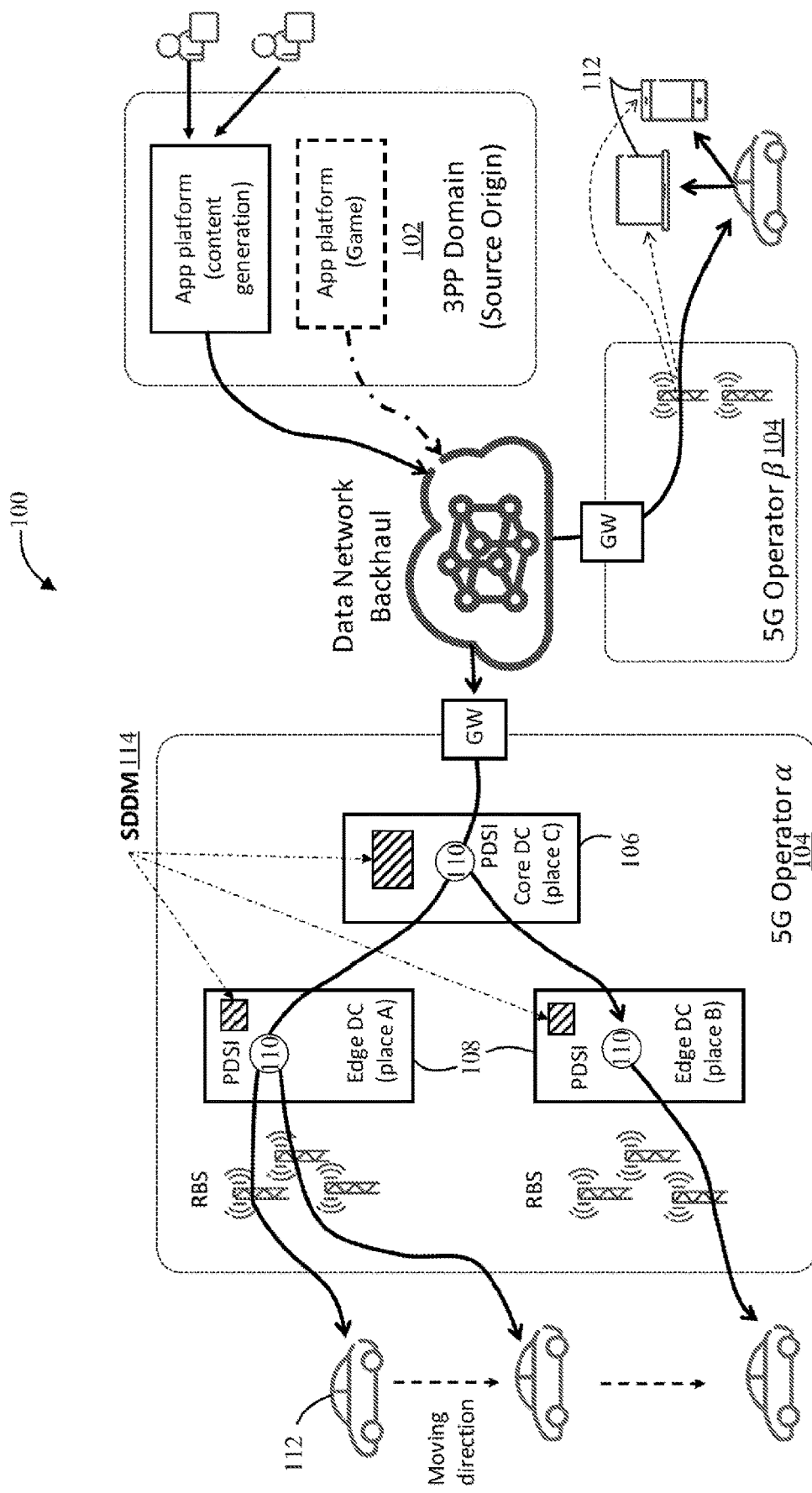
FIG. 1b is the schematic illustration of FIG. 1a with a smart data delivery management system.
Figure 2:
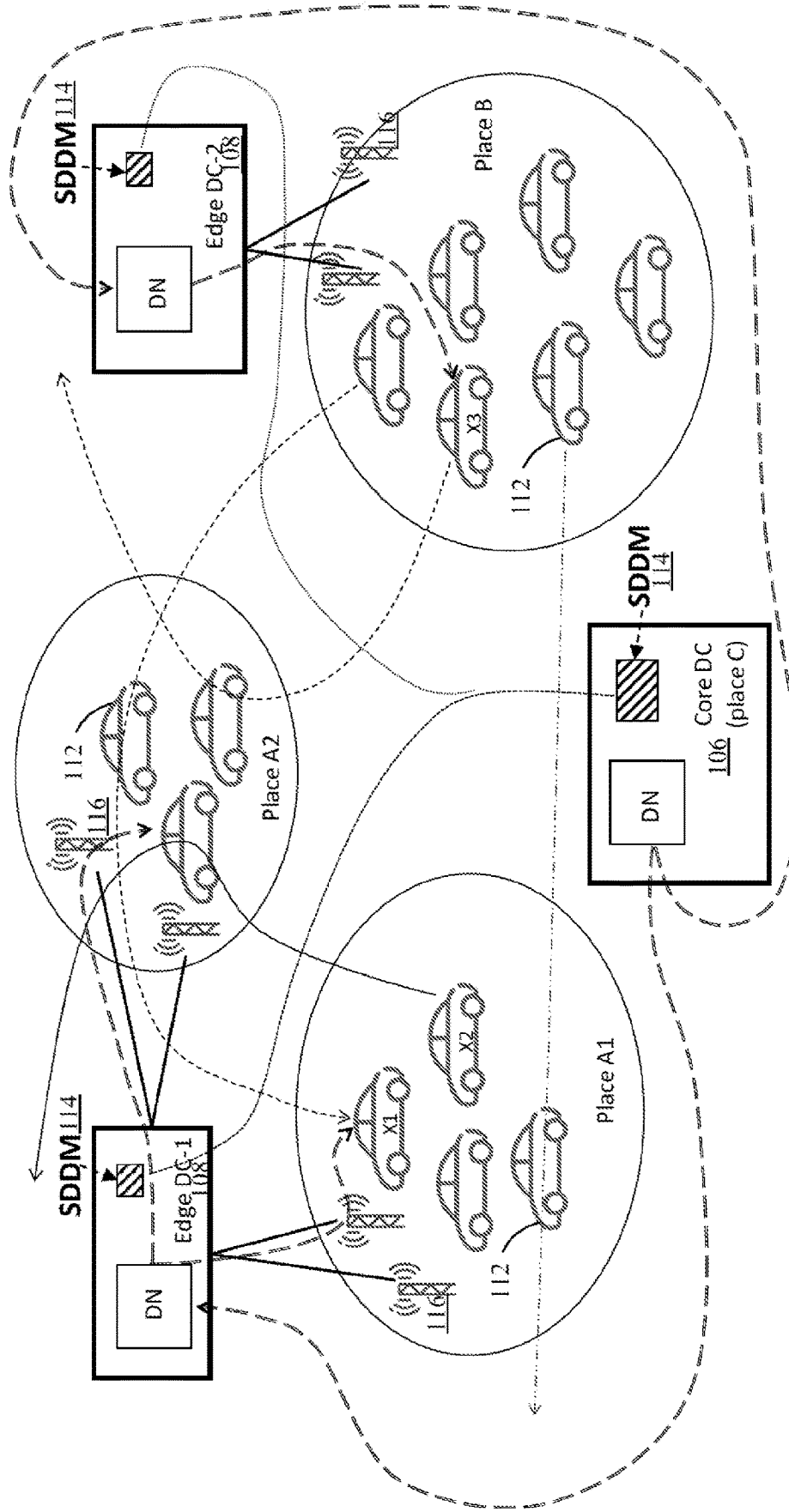
FIG. 2 is another schematic illustration of the 5G network or network slice with the smart data delivery management system.

FIG. 1b illustrates the same system as FIG. 1a, with the addition of smart data delivery management system (SDDM) 114 module, component or service in the 5G network infrastructure or 5G network slice. FIG. 2 shows a different view of the system of FIG. 1.

The SDDM 114 may consist of two to four pieces (FIGS. 3 and 4), a reinforcement learning (RL) based traffic pattern prediction (RTPPM) 120 component and a smart resource management (SRM) 122 component, and, additionally, a Software Defined Mobile network (SDM) orchestration (SDM-O) 124 component and a Data Center Management System (126) component. Other configurations may also be possible.

The RTPPM 120, based on location information collected through 5G mobile network, such as through mobility management (MM) 118, utilizes a reinforcement learning algorithm to predict the upcoming traffic patterns covered by the radio base stations (RBS)s 116. At the same time, the RTPPM provides a policy (to other components of the SDDM) to manage the resource efficiently, to fulfill the predicted traffic pattern as well as to respect the network slicing constraints defined for different service providers. Policy in this context is used in the sense of rules that can be executed by a single or by multiple entities. An example of policy can be an access policy, or access rules, which define which entities have access to certain contents.

Generally, reinforcement learning comprises interactions with the environment in discrete time steps. At each time t, observations are made. An action is then selected from a set of available actions, which is subsequently sent to the environment. The environment then moves to a new state and a reward associated with a transition is determined. A goal of a reinforcement learning is to get rewards. The action selected may be a function of the history or in some instances it could be random. A person skilled in the art would know how to implement reinforcement learning in the context provided herein.

The SRM 122 coordinates or orchestrates the resources in network slices defined for different service providers (computing capability, storage and network connectivity) according to policies given by RTPPM 120. A virtual network (network slice) comprises an independent set of logical network functions that support the requirements of a particular use case, with the term 'logical' referring to software.

Each slice is optimized to provide resources and network topology for specific service(s) and traffic that is going to be used by each slice. Functions such as speed, capacity, connectivity and coverage are allocated to meet the particular demands of each use case, but, in some cases, functional components may also be shared across different network slices.

As an example, the SRM 122 may utilize the resource management policy provided by the RTPPM 120 based on the real time traffic pattern collected from 5G RBS, then applies it to the SDM-O 124. The SDM-O makes the resource reservation (e.g. computing, storage), the corresponding network connectivity, and traffic routing arrangement, etc, in order to deliver the services for all the involved mobile devices (clients) 112 within the 5G network.

Figure 3:
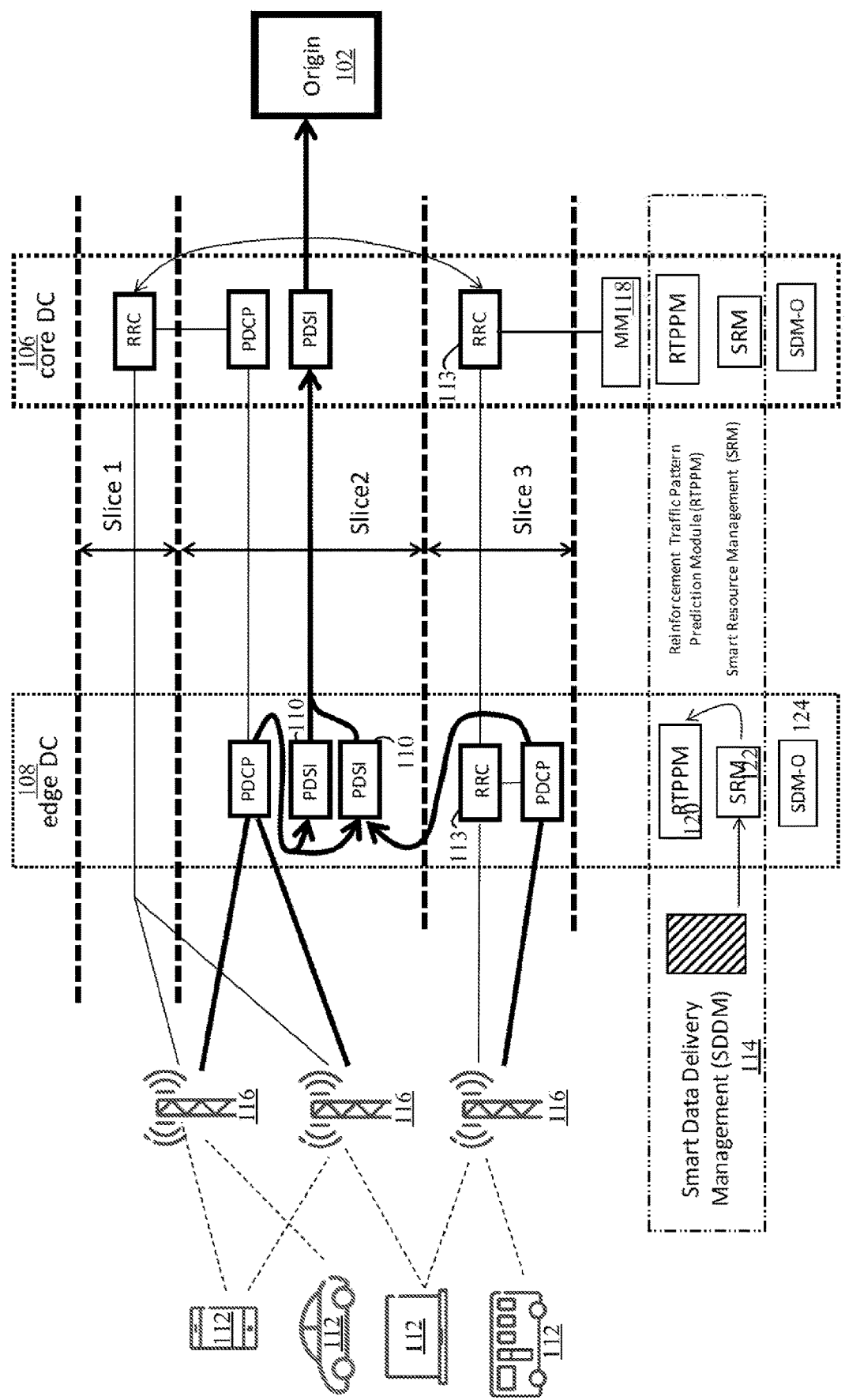
FIG. 3 is yet another schematic illustration a 5G network or network slice with details concerning the smart data delivery management system.

FIG. 3 illustrates the reinforcement learning based traffic pattern prediction. The location information of the mobile devices 112 is collected through the 5G network 100. It is retrieved from the MM 118 component, which itself gets it from the Radio Resource Control (RRC) 113. The location information is digitalized as input for a reinforcement learning algorithm. The representation of the traffic pattern can be either a graphic or non-graphic distribution. These types of distributions are well documented and known in the context of reinforcement learning and neural networks. Non-graphical distribution is a traditional way to prepare data to be fed to a neural network. For instance, non-graphic distribution may be done using a vector representation (such as a vector of binary values). In the case of network traffic representation, each vector would have its own distribution for each traffic scenario. These vector representations would then be fed to the neural network to train it.

Graphic representation can take the form of a network of nodes interconnected with edges, or other suitable graphic representation. Graphic representation can capture the relationship between different entities, in ways that non-graphic representations can't. The features of the traffic pattern are then captured by the deep learning neural network, such as a Convolution Neural Network (CNN) or another pattern/object recognition algorithm known in the art.

The outcome of the RTPPM 120 (which captures features of the traffic pattern in the form of a prediction) becomes on or more policies for managing the resources, e.g. the delivery nodes (and their computational capacity, storage and network connectivity) at certain locations. The policies are provided to and used by the delivery nodes 108, 106 through the packet delivery service instance(s) (PDSI) 110 across certain location or region, to provide the best services to the users who are using the mobile devices 112 or driving vehicles 112. Policies can be generated (and be different) for each node, region, etc., for each network slice.

Those policies are put in place through SRM 122 component, which eventually applies the policy through the SDM-O 124, as shown in FIG. 3.

As a result, quality of service (QoS) towards user experiences for different applications is increased while respecting the network slicing constraints defined for different service providers in the 5G network 100.

Figure 4:
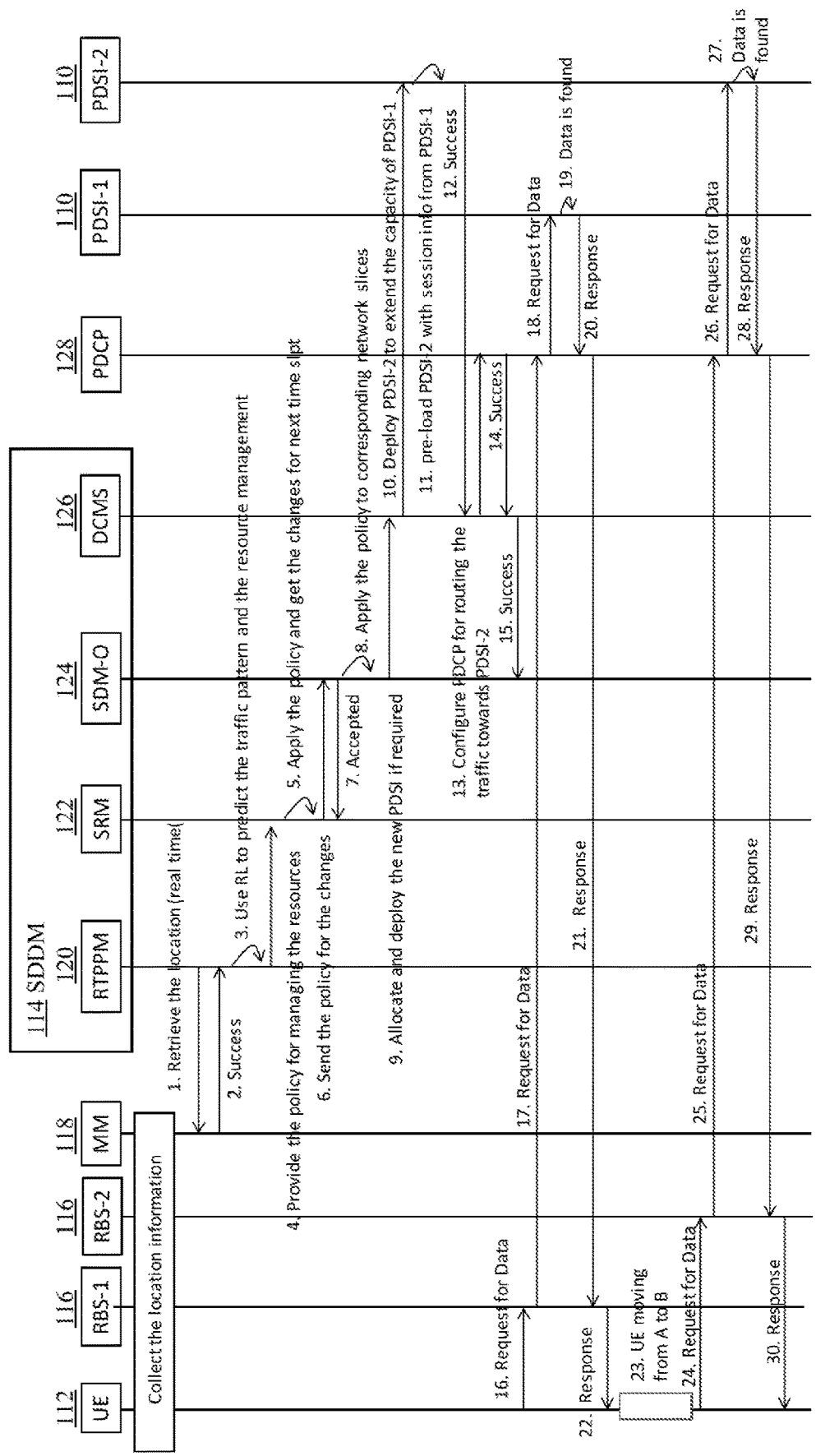
FIG. 4 is an example sequence diagram.

FIG. 4 presents an example in which the location of the mobile device (UE) 112 is constantly collected by the MM 118 with interaction with RBS-1 and RBS-2 116. The SDDM 114 comprises the RTPPM 120, the SRM 122, the SDM-O 124 and the DCMS 126 but could comprise, in different implementations, a different subset of components. At steps 1 and 2, the RTPPM 120 retrieves the information from the MM 118. At step 3, the RTPPM 120 digitalizes the information into a graphic or a non-graphic representation, and feeds the data representation into the reinforcement learning algorithm.

At step 4, the RTPPM 120 formats and provides the outcome of the RL algorithm, as the best policy for managing the delivery nodes (PDSI 110) in 5G network by fulfilling the predicted traffic pattern and respecting network slicing requirements for different applications at next time slot, to the SRM 122. The SRM 122 applies, at step 5, the policy and obtains changes to be applied for the next time slot.

In the case where it is determined that there will be a significant increase of requests for certain applications or contents based on the predicted traffic pattern, a new PDSI 110 may to be created. This is illustrated in steps 6-15. At step 6, the SRM 122 sends the policy for the change, i.e. the resource management policy, to the SDM-O 124. The SDM-O 124 accepts the policy at step 7, and applies it to the appropriate network slice at step 8. The SDM-O then allocates and deploys the new PDSI at step 9, if required, by communicating information concerning the need of a new PDSI, for example, to the DCMS 126, which is based on the outcome (policy) from the RTPPM. This happens, for example, when the DCMS needs to increase the resource capacity due to a predicted increasing number of the client requests at a certain location. In this case, in the policy, the number of needed PDSIs for the certain location may be bigger than the current one. A new PDSI is then created by the DCMS. This new PDSI needs the session information that the current PDSI has so that it can provide the same service without any impact on the client device(s) 112.

At step 10, the DCMS deploys a second PDSI 110 PDSI-2 to extend the capacity of PDSI-1. PDSI-2 110 is pre-loaded with session information from PDSI-1 at step 11 and returns success to the DCMS 126 at step 12.

At step 13, the DCMS 126 configures the Packet Data Convergence Protocol (PDCP) 128 for routing the traffic towards PDSI-2 110. Success is returned at steps 14 and 15.

Steps 16-30 illustrate a scenario in which a mobile device originally served by RBS-1 116 changes location and accordingly how it will be served by a newly deployed PDSI-2 110 after it is moving into the new location, which is covered by RBS-2.

At step 16, the UE 112 makes a request for data towards RBS-1 116. The request is forwarded from the RBS-1 116 towards PDCP 128, at steps 17, which in turn forwards it towards PDSI-1 110 at step 18. The data is found by PDSI-1 at step 19 and responses are sent back towards the UE at steps 20, 21 and 22.

The UE then moves and is now served by RBS-2 116. The UE 112 makes a second request for data, step 24. Once again, the request is forwarded towards PDCP 128, but this time from the RBS-2 116, at steps 25. This time, PDCP 128 forwards the request towards PDSI-2 110 at step 26. The data is found by PDSI-2 at step 27 and responses are sent back towards the UE at steps 28, 29 and 30.

In a scenario where the number of requests for certain applications or content on the predicted traffic pattern is reduced significantly, a similar (reverse) logic should be followed, in which PDSIs 110 should be removed or consolidated instead being added.

Figure 5:
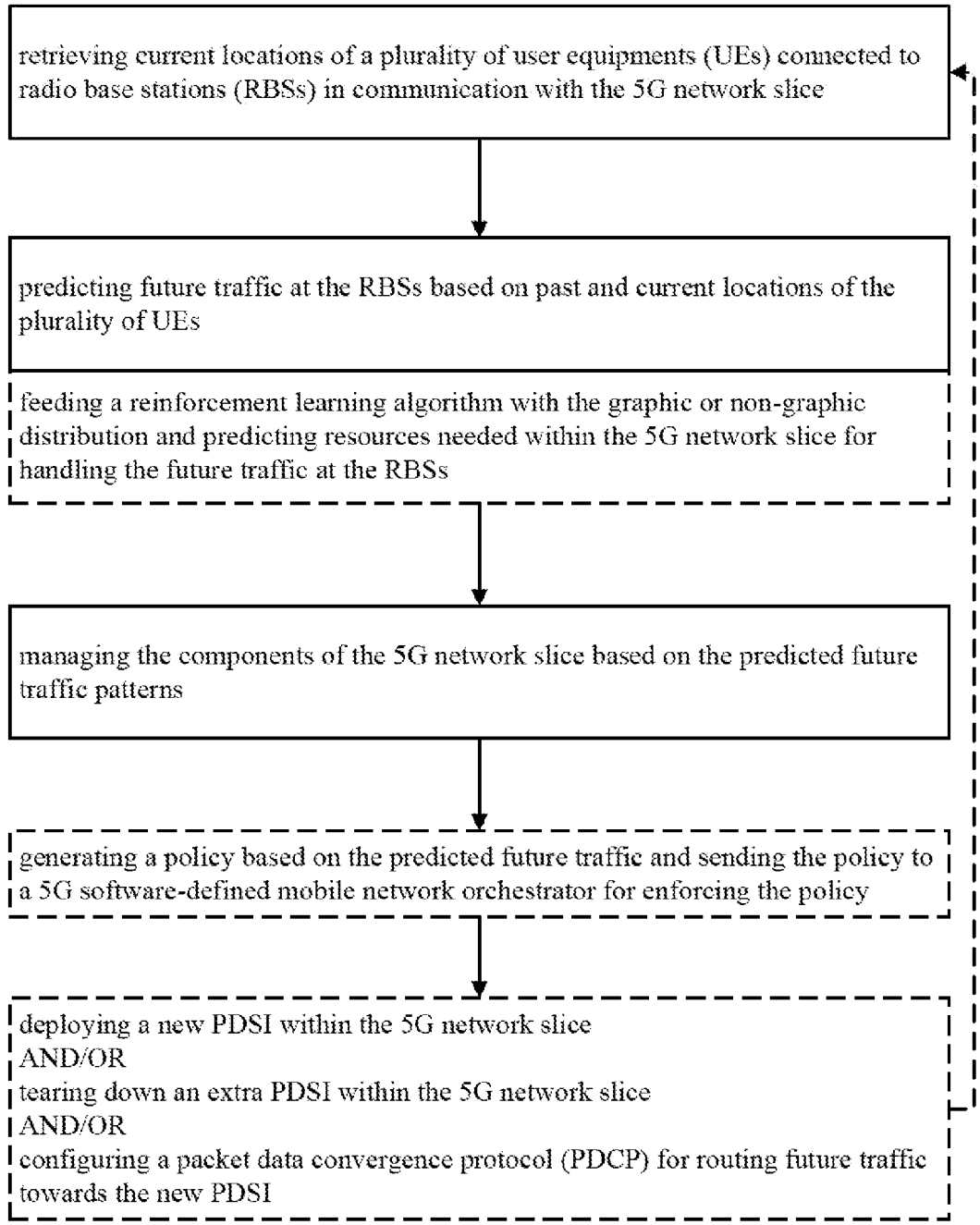
FIG. 5 is a flowchart of a method for managing components of a 5G network slice.

FIG. 5 illustrates a method for managing components of a fifth generation (5G) network slice. The method comprises retrieving current locations of a plurality of user equipments (UEs) connected to radio base stations (RBSs) in communication with the 5G network slice; predicting future traffic at the RBSs based on past and current locations of the plurality of UEs; and managing the components of the 5G network slice based on the predicted future traffic patterns.

The past and current locations of the plurality of UEs may be collected through a mobility management (MM) node. The past and current traffic and the past and current locations of the plurality of UEs may be represented as a graphic distribution. The past and current traffic and the past and current locations of the plurality of UEs may alternatively be represented as a non-graphic distribution. Predicting future traffic may further comprise feeding a reinforcement learning algorithm with the graphic or non-graphic distribution and predicting resources needed within the 5G network slice for handling the future traffic at the RBSs. The reinforcement learning algorithm may be based on a convolution neural network (CNN). The resources needed within the 5G network slice may comprise packet delivery service instances (PDSIs). Managing components of the 5G network slice may comprise generating a policy based on the predicted future traffic and sending the policy to a 5G software-defined mobile network orchestrator for enforcing the policy. Managing components of the 5G network slice may comprise deploying a new PDSI within the 5G network slice. The method may further comprise configuring a packet data convergence protocol (PDCP) for routing future traffic towards the new PDSI. Managing components of the 5G network slice may comprise tearing down an extra PDSI within the 5G network slice. The 5G network slice may use physical resources of physical delivery nodes located in data centers, each delivery node having a computational capacity, storage and network connectivity dedicated to the 5G network slice. Managing components of the 5G network slice may comprise coordinating and orchestrating the use of the physical delivery nodes while respecting network slicing constraints defined for different service providers. The steps of the method may be executed at predefined time intervals.

Figure 6:
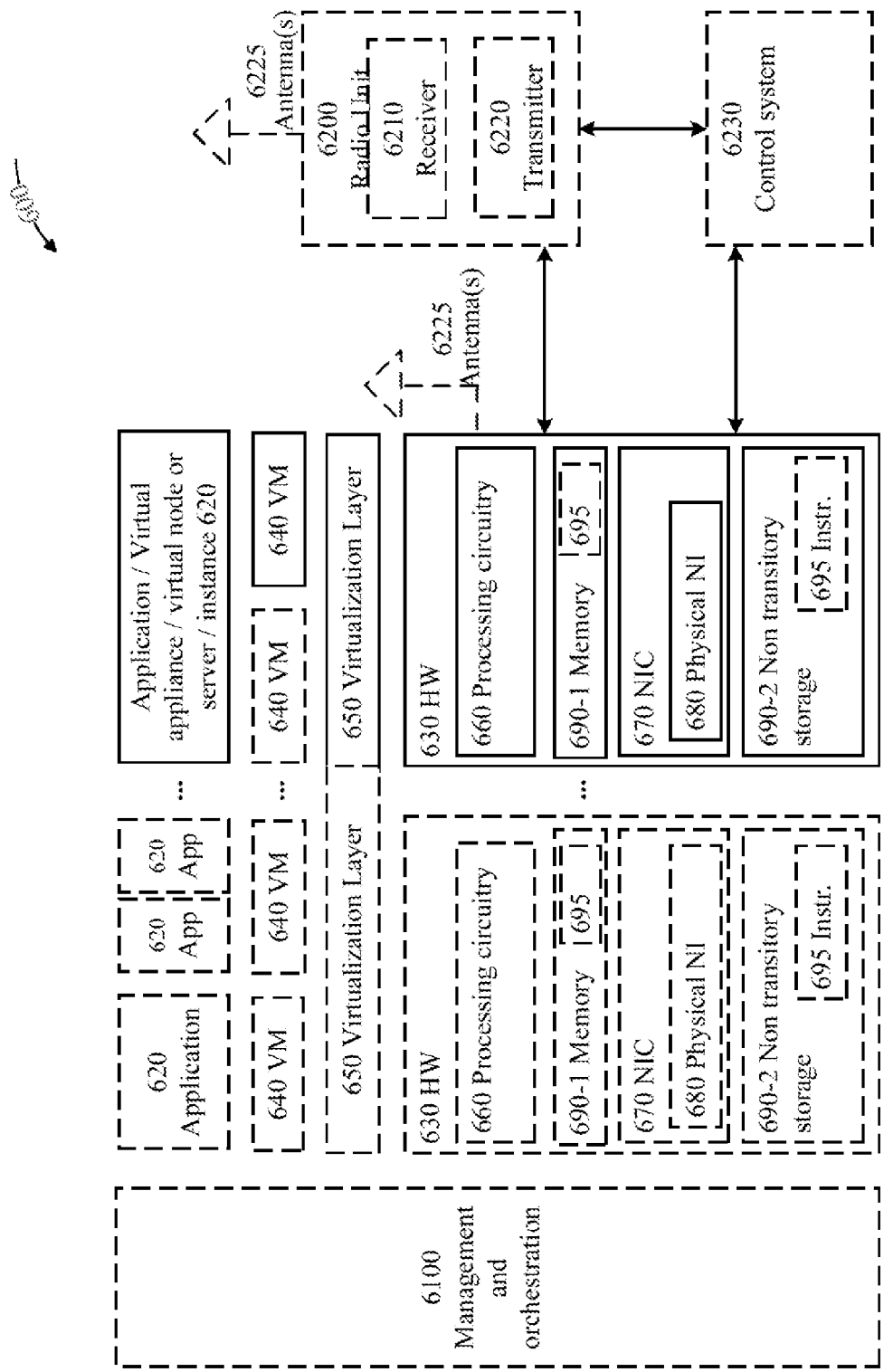
FIG. 6 is a schematic illustration of a system in which steps described herein may be implemented.

FIG. 6 is a schematic block diagram illustrating a virtualization environment 600 in which some functions may be virtualized. As used herein, virtualization can be applied to a node (e.g., a virtualized base station or a virtualized radio access node) or to a device (e.g., a UE, a wireless device or any other type of communication device) and relates to an implementation in which at least a portion of the functionality is implemented as one or more virtual components (e.g., via one or more applications, components, functions, virtual machines or containers executing on one or more physical processing nodes in one or more networks).

Some or all of the functions described herein may be implemented as virtual components executed by one or more virtual machines or containers implemented in one or more virtual environments 600 hosted by one or more of hardware nodes 630. Further, when the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement steps of some methods described herein. Applications 620 run in virtualization environment 600 which provides hardware 630 comprising processing circuitry 660 and memory 690. Memory 690 contains instructions 695 executable by processing circuitry 660 whereby application 620 is operative to provide any of the relevant features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by the processing circuitry 660. Each hardware devices may comprise one or more network interface controllers 670 (NICs), also known as network interface cards, which include physical network interface 680. Each hardware devices may also include non-transitory, persistent, machine readable storage media 690-2 having stored therein software 695 and/or instruction executable by processing circuitry 660. Software 695 may include any type of software including software for instantiating one or more virtualization layers 650 (also referred to as hypervisors), software to execute virtual machines 640 or containers as well as software allowing to execute functions described herein.

Virtual machines 640 or containers, comprise virtual processing, virtual memory, virtual networking or interface and virtual storage, and may be run by a corresponding virtualization layer 650 or hypervisor. Different instances of virtual appliance 620 may be implemented on one or more of virtual machines 640 or containers, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640 or to a container.

As shown in FIG. 6, hardware 630 may be a standalone network node, with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, a virtual machine 640 or container is a software implementation of a physical machine that runs programs as if they were executing on a physical, non-virtualized machine. Each of virtual machines 640 or container, and that part of the hardware 630 that executes that virtual machine, be it hardware dedicated to that virtual machine and/or hardware shared by that virtual machine with others of the virtual machines 640 or containers, forms a separate virtual network elements (VNE).

Still in the context of NFV, Virtual Network Function (VNF) is responsible for handling specific network functions that run in one or more virtual machines 640 or containers on top of hardware networking infrastructure 630 and corresponds to application 620 in FIG. 6.

One or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

Some signaling can be effected with the use of control system 6230 which may alternatively be used for communication between the hardware nodes 630 and the radio units 6200.

The system 600 is operative to manage components of a fifth generation (5G) network slice. The system 600 comprises processing circuits 660 and a memory 690, the memory containing instructions executable by the processing circuits whereby the system is operative to: retrieve current locations of a plurality of user equipments (UEs) connected to radio base stations (RBSs) in communication with the 5G network slice; predict future traffic at the RBSs based on past and current locations of the plurality of UEs; and manage the components of the 5G network slice based on the predicted future traffic patterns. The system 600 is also operative to execute any of the steps described herein.

With the method and system described herein, the 5G operators will be able to maintain high throughput and low latency for delivering data packets through their networks. The proposed solution improves the efficiency for dealing with the ad-hoc change of traffic patterns. It reduces the end to end latency of delivery of data packet from origin source to end users.

Service providers (middleware service providers, content providers, gaming application provider, etc. will benefits from a fast response from delivery nodes to their subscriber's request, for any communication application, content, and gaming application, etc. End user will benefit from the proposed solution by having a good user experience as well as reliable network service.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method for managing components of a fifth generation (5G) network slice, comprising:
retrieving current locations of a plurality of user equipments (UEs) connected to radio base stations (RBSs) in communication with the 5G network slice;
predicting future traffic at the RBSs based on past and current locations of the plurality of UEs, wherein predicting the future traffic comprises feeding a reinforcement learning algorithm with a graphic or a non-graphic distribution, the graphic or non-graphic distribution representing past and current traffic and the past and current locations of the plurality of UEs, and predicting resources needed within the 5G network slice for handling the predicted future traffic at the RBSs; and
managing the components of the 5G network slice based on the predicted future traffic patterns.

2. The method of claim 1, wherein the past and current locations of the plurality of UEs are collected through a mobility management (MM) node.

3. The method of claim 1, wherein the reinforcement learning algorithm is based on a convolution neural network (CNN).

4. The method of claim 1, wherein the resources needed within the 5G network slice comprise packet delivery service instances (PDSIs).

5. The method of claim 1, wherein managing components of the 5G network slice comprises generating a policy based on the predicted future traffic and sending the policy to a 5G software-defined mobile network orchestrator for enforcing the policy.

6. The method of claim 1, wherein managing components of the 5G network slice comprises deploying a new PDSI within the 5G network slice.

7. The method of claim 6, further comprising configuring a packet data convergence protocol (PDCP) for routing future traffic towards the new PDSI.

8. The method of claim 1, wherein managing components of the 5G network slice comprise tearing down an extra PDSI within the 5G network slice.

9. The method of claim 1, wherein the 5G network slice uses physical resources of physical delivery nodes located in data centers, each delivery node having a computational capacity, storage and network connectivity dedicated to the 5G network slice and wherein managing components of the 5G network slice comprises coordinating and orchestrating the use of the physical delivery nodes while respecting network slicing constraints defined for different service providers.

10. The method of claim 1, wherein the steps of the method are executed at predefined time intervals.

11. A system for managing components of a fifth generation (5G) network slice comprising processing circuits and a memory, the memory containing instructions executable by the processing circuits whereby the system is operative to:
retrieve current locations of a plurality of user equipments (UEs) connected to radio base stations (RBSs) in communication with the 5G network slice;
predict future traffic at the RBSs based on past and current locations of the plurality of UEs;
feed a reinforcement learning algorithm with a graphic or a non-graphic distribution, the graphic or non-graphic distribution representing the past and current traffic and the past and current locations of the plurality of UEs, and to predict resources needed within the 5G network slice for handling the future traffic at the RBSs; and
manage the components of the 5G network slice based on the predicted future traffic patterns.

12. The system of claim 11, wherein the past and current locations of the plurality of UEs are collected through a mobility management (MM) node.

13. The system of claim 11, wherein the reinforcement learning algorithm is based on a convolution neural network (CNN).

14. The system of claim 11, wherein the resources needed within the 5G network slice comprise packet delivery service instances (PDSIs).

15. The system of claim 11, further operative to generate a policy based on the predicted future traffic and to send the policy to a 5G software-defined mobile network orchestrator for enforcing the policy.

16. The system of claim 11, further operative to deploy a new PDSI within the 5G network slice.

17. The system of claim 16, further operative to configure a packet data convergence protocol (PDCP) for routing future traffic towards the new PDSI.

18. The system of claim 11, further operative to tear down an extra PDSI within the 5G network slice.

19. The system of claim 11, wherein the 5G network slice uses physical resources of physical delivery nodes located in data centers, each delivery node having a computational capacity, storage and network connectivity dedicated to the 5G network slice and further operative to coordinate and orchestrate the use of the physical delivery nodes while respecting network slicing constraints defined for different service providers.

20. The system of claim 11, further operative to execute operations at predefined time intervals.

21. A non-transitory computer readable media having stored thereon instructions for managing components of a fifth generation (5G) network slice-the instructions comprising:
retrieving current locations of a plurality of user equipments (UEs) connected to radio base stations (RBSs) in communication with the 5G network slice;
predicting future traffic at the RBSs based on past and current locations of the plurality of UEs, wherein predicting the future traffic comprises feeding a reinforcement learning algorithm with a graphic or a non-graphic distribution, the graphic or non-graphic distribution representing past and current traffic and the past and current locations of the plurality of UEs, and predicting resources needed within the 5G network slice for handling the predicted future traffic at the RBSs; and
managing the components of the 5G network slice based on the predicted future traffic patterns.

* * * * *